United States Patent
Law et al.

(10) Patent No.: US 10,139,118 B2
(45) Date of Patent: Nov. 27, 2018

(54) AIR TREATMENT APPARATUS AND METHOD

(71) Applicant: Akos R&D Ltd., Shatin, N.T. (HK)

(72) Inventors: Sui Chun Law, Shatin (HK); Yiu Wai Chan, Shatin (HK)

(73) Assignee: AKOS R&D Ltd., Hong Kong (HK)

( * ) Notice: Subject to any disclaimer, the term of this patent is extended or adjusted under 35 U.S.C. 154(b) by 0 days.

(21) Appl. No.: 15/380,363

(22) Filed: Dec. 15, 2016

(65) Prior Publication Data

US 2017/0097163 A1  Apr. 6, 2017

Related U.S. Application Data

(63) Continuation-in-part of application No. 13/304,513, filed on Nov. 25, 2011, now Pat. No. 9,562,702.

(30) Foreign Application Priority Data

Jan. 14, 2011  (HK) .................... 11100409.2

(51) Int. Cl.
*B01D 53/02* (2006.01)
*F24F 6/00* (2006.01)
(Continued)

(52) U.S. Cl.
CPC ............ *F24F 6/00* (2013.01); *B01D 46/0023* (2013.01); *B01D 46/0036* (2013.01); *B01D 46/0045* (2013.01); *B01D 46/4227* (2013.01); *B01D 46/4263* (2013.01); *B01D 46/46* (2013.01); *B01D 53/75* (2013.01); *F24F 3/14* (2013.01); *F24F 3/16* (2013.01); *F24F 3/1603* (2013.01); *F24F 11/30* (2018.01); *F24F 13/20* (2013.01);
(Continued)

(58) Field of Classification Search
CPC ... B01D 53/34; F24F 13/20; F24F 2011/0067; F24F 2221/36; F24F 3/1603
See application file for complete search history.

(56) References Cited

U.S. PATENT DOCUMENTS 5,186,903 A  2/1993  Cornwell
5,681,533 A  10/1997  Hiromi
(Continued)

FOREIGN PATENT DOCUMENTS

CN  1103942 A  6/1995
CN  1380924 A  11/2002
(Continued)

*Primary Examiner* — Christopher P Jones
(74) *Attorney, Agent, or Firm* — Muncy, Geissler, Olds & Lowe, P.C.

(57) ABSTRACT

An air treatment apparatus and method are disclosed in the present invention, wherein, at least one air treatment unit is included. The unit comprises air inlet, air outlet, air treatment devices and connecting components. The air treatment device is located between the air inlet and the air outlet. The air treatment device comprises at least one of the following components: component for air purification and filtering, blow-through fan, draw-through fan, pump, component for heating, component for dehumidifying, component for humidifying, component for air-cooling. The air treatment unit can be used alone for improving the air quality of the environment. When more than one unit are connected together with the connecting components, the units are teamed up and work together, and an air treatment system is formed.

10 Claims, 13 Drawing Sheets

(51) Int. Cl.
  *B01D 46/46*   (2006.01)
  *B01D 46/00*   (2006.01)
  *B01D 46/42*   (2006.01)
  *F24F 13/20*   (2006.01)
  *F24F 3/14*    (2006.01)
  *F24F 3/16*    (2006.01)
  *B01D 53/75*   (2006.01)
  *F24F 11/30*   (2018.01)
  *B01D 53/32*   (2006.01)
  *B01D 53/82*   (2006.01)
  *B01D 53/88*   (2006.01)
  *F24F 110/10*  (2018.01)
  *F24F 110/20*  (2018.01)
  *F24F 110/50*  (2018.01)
  *F24F 11/54*   (2018.01)

(52) U.S. Cl.
  CPC .............. *B01D 53/32* (2013.01); *B01D 53/82* (2013.01); *B01D 53/885* (2013.01); *B01D 2255/00* (2013.01); *B01D 2257/104* (2013.01); *B01D 2257/404* (2013.01); *B01D 2257/502* (2013.01); *B01D 2257/504* (2013.01); *B01D 2257/708* (2013.01); *B01D 2257/80* (2013.01); *B01D 2257/91* (2013.01); *B01D 2258/06* (2013.01); *B01D 2259/804* (2013.01); *F24F 11/54* (2018.01); *F24F 2110/10* (2018.01); *F24F 2110/20* (2018.01); *F24F 2110/50* (2018.01); *F24F 2221/36* (2013.01); *Y02B 30/78* (2013.01)

(56) References Cited

U.S. PATENT DOCUMENTS

| | | |
|---|---|---|
| 6,113,674 A | 9/2000 | Graham et al. |
| 7,122,120 B2 | 10/2006 | Diel |
| 7,419,533 B2 | 9/2008 | Son et al. |
| 2002/0193064 A1 | 12/2002 | Michalakos et al. |
| 2010/0251677 A1 | 10/2010 | Franck |

FOREIGN PATENT DOCUMENTS

| | | |
|---|---|---|
| CN | 2637964 Y | 9/2004 |
| CN | 1546914 A | 11/2004 |
| CN | 1740681 A | 3/2006 |
| CN | 2819097 Y | 9/2006 |
| CN | 1888634 A | 1/2007 |
| CN | 101165417 A | 4/2008 |
| CN | 201129811 Y | 10/2008 |
| CN | 101644470 A | 2/2010 |
| DE | 100 14 485 A1 | 9/2001 |
| EP | 1 982 734 A1 | 10/2008 |
| WO | WO 93/22603 | 11/1993 |

AIR TREATMENT APPARATUS AND METHOD

This nonprovisional application is a continuation-in-part application of U.S. application Ser. No. 13/304,513, which was filed on Nov. 25, 2011, and which claims priority to Hong Kong Patent Application No. 11100409.2, which was filed in Hong Kong on Jan. 14, 2011, and which are both herein incorporated by reference.

BACKGROUND OF THE INVENTION

Field of the Invention

This invention is related to the subject of the environmental protection. More specifically, it is related to an air treatment apparatus and method.

Description of the Background Art

Conventionally, air cleaners with filters of different variety and functions are employed for treating and purifying the air. They are also used for solving air quality problems generated by different sources of pollutants. These air cleaners are usually accompanied by filters of different types. In order to achieve more effective air purification, in a location with different pollutant levels, the airflow rate and path within the air cleaners can be controlled accordingly based on the signal and data obtained by the environment sensors.

When a user purchases an air cleaner from the market, he/she generally estimates the type and size of the air cleaner to be purchased by assessing the dimensions of the location where the air cleaner(s) is/are to be applied. The estimation criteria are usually based on the specified size of the air cleaner, the specified airflow volume and the suggestions and recommendations by the manufacturers. A decision will also be made based on Clean Air Delivery Rating (CADR), which is a guideline offered by the Association of Home Appliance Manufacturers (AHAM) of USA. If the dimensions of the location are small, small air cleaners with lower airflow volume will usually be purchased. If area is large then more bulky air cleaners with higher airflow volume will be preferred.

The application of these conventional air cleaners actually lack of flexibility if they are to be shifted between areas of different sizes, and/or with pollutants of different sources and different levels, or if they are moved from a larger area to smaller area.

The present invention offers an air purification apparatus and method to solve the problem of lack of flexibility of conventional air cleaners.

SUMMARY OF THE INVENTION

The present invention offers an air purification apparatus and method to solve the problem of lack of flexibility of the conventional air cleaners.

In the present invention offered an air treatment apparatus including
  at least one air treatment unit comprising of air inlet and air outlet, air treatment device and connecting components; the air treatment device is located between the air inlet and the air outlet;
  the air treatment device comprises at least one of the following components: components for air purification and filtering, heating, dehumidifying, humidifying, air-cooling, and/or components of blow-through fan, a draw-through fan, pump;
  when the air treatment unit is being employed alone, it can be used for improving the air quality of the environment; when more than one air treatment units are connected together by their connecting components, the air treatment units are teamed up with each other, they operate in co-ordination with one another together and an air treatment system is built.

Different air purification efficiency and performance are resulted when (i) employing the air treatment units individually and (2) to team up them into one air treatment system and allow them to operate in co-coordination with one and other.

The present invention further offered an air treatment apparatus:
  air treatment units each comprising:
    an air inlet;
    an air outlet;
    an air treatment device located between the air inlet and the air outlet; and connecting components,
    wherein the air treatment device within the air treatment units comprises at least one of the following components: components for air purification and filtering, heating, dehumidifying, humidifying, air-cooling, and/or components of blow-through fan, a draw through fan, or a pump,
  wherein the air treatment device in the air treatment units are of different types,
  wherein the air treatment units are linkable and connectable by the connecting components, the connecting components further comprise a transmitter and a receiver,
  wherein connection of the air treatment units is non-substantially performed,
  wherein the air treatment units may operate in a first mode in which the air treatment units operate in coordination with one another together as a built system and a second mode in which the air treatment units operate alone as separate individual units, and
  wherein the air treatment units are configured to operate in the first mode and the second mode according to at least one level obtains by at least one environmental sensor, the first mode and the second providing different air treatment efficiency and performance.

The at least one environmental sensor for obtaining the level from at least one of the following environmental parameters: temperature, humidity, volatile organic compounds, formaldehyde, carbon dioxide, carbon monoxide, dust, ozone, nitrogen oxides, airborne bacteria, radon, air speed, air flow, air pressure and brightness of the environment; and/or at least a position sensors for detecting the position of the air treatment unit.

In one embodiment, the at least one environmental sensor is located off-site from the air treatment apparatus; the level obtained from the at least one environmental sensor is employed to operate the air treatment units in the first mode and the second mode by at least one of the following methods:
  i. the level obtained from the at least one environmental sensor is input to a microcontroller unit, which is located off-site from the air treatment apparatus; the microcontroller unit determine the mode of operation and send to the each air treatment units the determination on the mode of operation by a receiver and transmitter wirelessly;
  ii. the level obtained from the at least one environmental sensor is input to a microcontroller unit, which the microcontroller is further located in the air treatment apparatus; the microcontroller unit determine the mode of operation and send to the each air treatment units the determination on the mode of operation by a receiver and transmitter wirelessly;

iii. the level obtained from the at least one environmental sensor is input to microcontroller units which located within the air treatment units through a receiver and transmitter wirelessly; the microcontroller unit determine the mode of operation and send to the each air treatment units.

The connecting component further comprises a buckle; in the buckle a protruded part and a recessed part are included; the protruded part of the buckle of one air treatment unit is fitted to the recessed parts of the buckle of another air treatment unit.

The connecting component further comprises a buckle; wherein the buckle including a protruded part and a recessed part; the protruded part of the buckle of one air treatment unit is fitted to the recessed parts of the buckle of another air treatment unit.

When the protruded part of the buckle of one air treatment unit is fitted to the recessed parts of the buckle of another air treatment unit, the air treatment units are then linked and operate in coordination with each other together.

The connecting component is made and formed by the appearance of the casing of the air treatment unit; wherein part of the casing of the air treatment unit contains a protruded shape and part of the casing of the air treatment unit contains a recessed shape, the protruded shape of one air treatment unit is fitted to the recessed shape of another air treatment unit.

When the protruded shape of one air treatment unit is fitted to the recessed shape of another air treatment unit, the units are then linked and operate in coordination with each together.

The connecting component comprises a transmitter and a receiver. The transmitter of one air treatment unit sends out connection message to the receiver of another air treatment unit.

The connection message is in any of the following formats: electromagnetic wave, sound wave, electrical wave, magnetic wave, or of the combination of the thereof.

When the transmitter of one air treatment unit sends out connection message to the receiver of the another air treatment unit, the air treatment unit and linked and operate in coordination with the another air treatment unit.

The connecting components comprise a fastener that mechanically joins or affixes two or more air treatment units together.

The connecting component is allowed to fastened and unfastened repeatedly; while fastened, the air treatment units in the air treatment system are in connection and operate in co-ordination with one and other.

The connecting components can be detached from the air treatment unit when the air treatment unit is working alone individually.

The air treatment unit is flexible to be swapped for another air treatment unit within the air treatment system. The effectiveness of air treatment before and after swapping can be the same or different.

An air treatment unit is flexible to be included into or excluded from the air treatment system.

An air treatment unit within the air treatment system is flexible to be swapped for another air treatment unit within the air treatment system. The air treatment system performs differently after the swapping of the air treatment units. User can select to swap any air treatment unit within the air treatment system according to the environmental condition of the location where the air treatment system being employed.

An additional air treatment unit is flexible to be included into the air treatment system. The air treatment system performs differently after the swapping of the air treatment units. User can select to include any air treatment unit within the air treatment system according to the environmental condition of the location where the air treatment system being employed.

An air treatment unit within the air treatment system is flexible to be excluded from the air treatment system. The air treatment system performs differently after the swapping of the air treatment units. User can select to exclude any air treatment unit within the air treatment system according to the environmental condition of the location where the air treatment system being employed.

The air inlet and air outlet are mounted relatively on the exterior of the casing of the air treatment unit.

When two or more than two air treatment units are teamed up and the air treatment system is built, all the air inlets and air outlets in the system are pointing toward the environment without being obstructed.

When two or more than two air treatment units are teamed up and the air treatment system is built, the air outlets of some air treatment units are connected and linked directly to the air inlets of their neighborhood air treatment units.

When two or more than two air treatment units are teamed up and the air treatment system is built, all the air outlets of the air treatment units, excepting the last air treatment units which located at the end of the system, are connected and linked directly to the air inlets of the neighborhood air treatment units.

When the connecting components connect the air treatment units by the direct contacting, an outer casing which is used to encapsulate the all the air treatment units in the air treatment system is included; the outer casing further comprises at least one air inlet and at least one air outlet that fit with the air inlet and air outlet of the air treatment units of the air treatment system; wherein the air inlet and air outlet of the air treatment units are pointing toward the environment without being obstructed.

The outer casting further acts as a fastener, which mechanically holds and affixes the all air treatment units in the air treatment system together. The outer casing also further enhance the safety measure of the system such as increase the barrier for voltage, by increasing the creepage distance for the voltage, when the power source of the air treatment units in the air treatment are also being connected together.

The air treatment unit contains a central processing unit.

The connecting component comprises a key, when the air treatment units are linked together through the connecting component, the key will be activated.

The activated key will send signal to central processing unit and informing the central processing unit that the connecting components are being linked up, the central processing unit then control the air treatment units to team up and operate in coordination with one another.

The air treatment unit contains at least one environmental sensor for obtaining the level from at least one of the following environmental parameters: temperature, humidity, volatile organic compounds, formaldehyde, carbon dioxide, carbon monoxide, dust, ozone, nitrogen oxides, airborne bacteria, radon, air speed, air flow, air pressure and brightness of the environment.

The air treatment unit includes a position sensor for detecting the position of the air treatment unit.

The position sensor sends the signal of the detected position location to central processing unit of the air treatment unit.

The central processing unit computes the best combination and orientation manner for placing the air treatment unit based on the signal obtained from the position and environment sensors. These recommendations and suggestions on the best combination and orientation manner will be provided to the user or will be offered to the air treatment system.

The air treatment unit contains connectors for linking the electric sources.

When the air treatment units are teamed up and being built together into an air treatment system, the connectors of the air treatment units for linking the electric sources are connected.

The air treatment unit is pre-implemented with embedded software for controlling the operation setting of the air treatment unit in the system.

The central processing unit of the air treatment unit receives the signals from the outside to control the operation setting of the air treatment units in the system.

The central processing unit of the air treatment unit receives the signal from the sensor for controlling the operation setting of the air treatment units in the system.

The operation setting for the air treatment unit includes one or more than one of the following parameter setting: the operating time, the air flow rate, the air flow path, the on and off of the heating component, the temperature setting of the heating component, the on and off of the cooling component, the temperature setting of the cooling component, the on and off of the dehumidifying component, the dehumidifying level setting of the dehumidifying component, the on and off of the humidifying component, the humidifying level setting of the humidifying component.

When two or more than two air treatment units are teamed up and built into an air treatment system, one of the air treatment unit is appointed as the master air treatment unit, and the rest of the air treatment units are appointed as secondary air treatment units.

The central processing unit of the master air treatment unit controls the operation setting in the central processing unit of the secondary air treatment unit.

The air treatment unit includes a selector for setting of itself as a master air treatment unit or a secondary air treatment unit.

The air treatment unit is pre-implemented with embedded software for setting the air treatment unit to be a master air treatment unit or a secondary air treatment unit.

The air treatment system includes a controller for controlling the operation of air treatment units in the system.

The air treatment unit contains at least one interface port; the central processing unit of the air treatment unit receives and transmits the data through the interface port.

The signal being transmitted through the interface port contain at least one of the following information: the identities setting to be master or secondary air treatment units within the air treatment system, the types of the air treatment units and their respective quantities in the system, the operation setting of the air treatment units within the air treatment system.

An air treatment method for improving and treating the air, wherein the following procedures are included: based on the room dimensions and the distribution pattern of the pollutants in the area being concerned, the mode of:

whether to allow the air treatment units to operate individually, or to connect two or more of the air treatment units through the linking of the connecting components, team them up and allow them operate in co-ordination with one and other and an air treatment system is built.

will be selected.

The position sensor and environment sensor are employed to detect the room size and the distribution pattern of the pollutants in the area being concerned.

When the pollutants are evenly distributed in the area of being concerned, the air treatment units in the area are operated individually; when the pollutants are concentrated in certain location in the area, the air treatment units will be connected, being teamed up and operate in coordination with one another together.

When the air treatment units are linked and built together into an air treatment system, the keys of the connecting components will be activated. The activated keys send signal to the central processing units and inform them that the connecting component are being connected, the central processing units then control the air treatment units to operate in co-ordination with one and other according to the specific operation setting.

The central processing units of the air treatment units determine whether to set the air treatment units as a master or secondary air treatment units manually or automatically based on the embedded software which was implemented into it previously.

If the setting of the air treatment units as master or secondary air treatment units are to be performed manually, the user will appoint one air treatment unit as a master unit and the rest as secondary air treatment unit; if the setting of the air treatment units as master or secondary air treatment units are being set automatically, the central processing units appoint the one air treatment unit as a master air treatment unit and the rest as secondary air treatment units in the system.

The central processing unit of the master air treatment unit overrides that of the secondary air treatment unit; the central processing unit of the master air treatment unit controls and determines the operation setting of the secondary air treatment units.

The central processing unit of the master air treatment unit determines whether to accept the out coming-messages to control the operation of all the air treatment units within the system; if the master air treatment unit determines to accept the out coming-messages, the operation of all air treatment units within the air treatment system will be controlled by the out coming-messages.

The air treatment method further comprise the following procedures: the central processing unit determines whether to control the air treatment units within the system based on the data obtained from the sensors within the system; if not, then the central processing unit will operate and control the air treatment units within the system according the control program which was implemented into it beforehand; if yes, the central processing unit will compute and calculate the best combination and orientation manner of the air treatment units, and operate and control the air treatment units within the system according these computed results.

The air treatment units to be linked and connected together by the connecting components, being teamed up and operate in co-ordination with one and other together as a built system. The air treatment units, in fact, are capable to operate alone as different individual units. The present invention allows a flexible design of the air treatment apparatus based on the actual necessity and requirement of the environment. By doing so, the performances and efficiencies of the apparatus to improve the air quality can be enhanced. The invention also helps to minimize the used of materials and consumable parts. Besides saving the occupied space and area, the generation of the secondary pollutant are reduced. The present invention allows the air treatment units of the system to be operated in co-ordination with sensors within the system intelligently or according to the command received from outside of the system. The overall workload of the air treatment units in the system can be minimized by the mean of the automation.

As the quality of life and living standard of people are improving, a variety of air treatment devices with different types and purposes are always found to be co-existed in one location. For example, heaters, air coolers, air purifiers, dehumidifiers, humidifiers may happen to be found in one location. They usually share the common features having fans, sensors and filters. They also share the common characteristics of being bulky and occupying significant spaces in a location. More importantly, many functions among these devices are overlapped. These devices are not in connections with one another. They will not be turned on and work and cooperate automatically in an area where the air quality alternation is happening or during the change of season. The present invention re-structured and re-arranges the apparatus so that they system occupies much smaller room space, and able to operate at suitable mode automatically in according to the air quality conditions and seasons.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
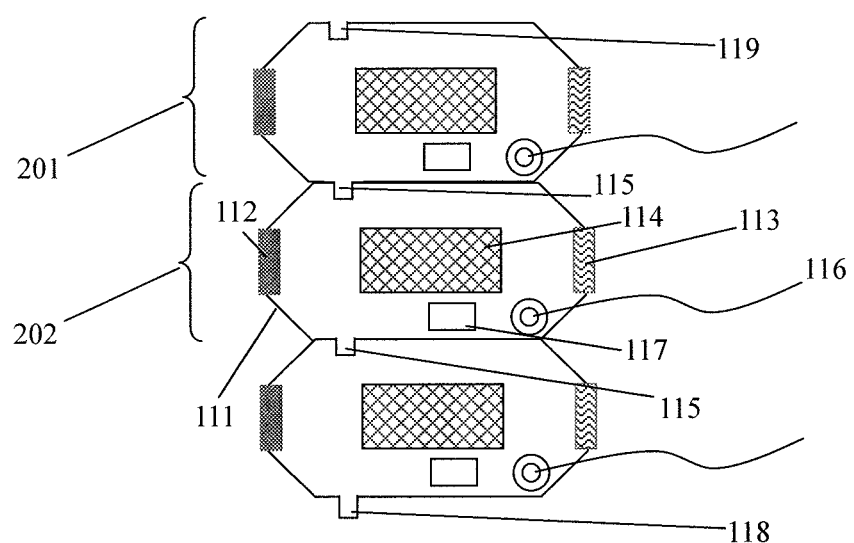
FIG. 1 is a schematic diagram of the present invention according to a first embodiment.

Refer to the FIG. 1; an air treatment system is built up by of three air treatment units 201, 202 and 203. Each air treatment unit 201, 202 and 203 comprises a casing 111, an air inlet 112, an air outlet 113, an air treatment device 114, connectors for connecting the electric sources 116, a central processing unit (CPU) 117 and a connecting component. The air treatment device 114 is equipped between the air inlet 112 and air outlet 113. The air inlet 112, air outlet 113, the connectors for connecting the electric sources 116 and the connecting component are located on the exterior of the casing 111. The air treatment device 114 and central processing unit 117 is equipped within the casing 111. If the manual mode is selected as the operating mode for these air treatments units, the operation setting inside the central processing unit is set manually. If the automatic mode is selected as the operating mode for these units, then the central processing units control the air treatment units to operate according to the operation setting by the embedded program which was pre-implemented into the CPU beforehand.

The air treatment device 114 further comprises at least one or more than one of the following components: components for air purification and filtering, heating, dehumidifying, humidifying, air-cooling, air blow-through fan. The air treatment device 114 equipped within the air treatment units 201, 202 and 203 may be entirely same types, only part of the devices are of the same types, or completely different types. In the present example, all the air treatment devices 114 of the three air treatment unit 201,202 and 203 comprising the components for air purification and filtering as well as air blow-through fans. The incoming air is first enter into the unit through the air inlet 112 which is located at the casing 111, then, it pass by the components for air purification and filtering and the air blow-through fan within the unit, and exit the unit through the air outlet 113.

In the present embodiment, the connecting components further comprise a buckle; wherein the buckle including a protruded part 115 and a recessed part 119. The air treatment units are linked together by the substantially connection of the units through the bucket. In another word, the protruded part 115 of one air treatment unit is fitted into the recessed part 119 of another air treatment unit. The two units are teamed up and operate in co-ordinations with one and other together. As shown in this example, the protruded parts 115 of air treatment unit 201 is fitted into the recessed parts 119 of the air treatment unit 202 as a pair, and the two units 201 and 202 are teamed up and operate in co-ordination with one and other together.

When working alone as individual units, the air treatment units 201, 202 and 203 have the abilities to improve the air quality of the environment by themselves individually. If they are connected together through the protruded parts and recessed parts of the buckets, they are then teamed-up and co-operate to work together. An air treatment system is built.

The connecting component in each of air treatment unit further comprises at least one key. The key is maybe located on the exterior of the casing. When the connecting components of the units are being linked together, the keys will be activated. The activated key sends out signal to the central processing units, and informs the central processing units that the connecting components are connected together. Beside, the signals about orientation of different connected units and they way of connection may also be sent to the central processing unit through the activated key. The key can be a mechanical micro-switch of any kind or an electronic sensing button of any kind. When the central processing unit received the signal about the connection of connecting component, the related program correspond to the operation setting of the connected units will then be executed. The air treatment units within the system are then team up, cooperate and work together according these operation settings.

In the present embodiment, the air inlet 112 and air outlet 113 are located on the exterior of the casing 111. When the air treatment system is built with these units, the all the air inlet 112 and air outlet 113 in the system are pointing toward the environment without being obstructed. The air outlets and air inlets are purposely being separated apart distantly, so as to prevent the short-circuiting of air-path to be happened, which will otherwise leads to treatment of air in a localize area, which also preventing the air from the more distance location to flow to and approach to the air inlet of the system through convection.

To apply and employ each air treatment units individually or to team up them one air treatment system and allow them to operate together by co-coordinating one and other, very different air purification efficiency and performance can be achieved. For example, in a location where different types of pollutants are distributed evenly, the air treatment units containing the components for air purification and filtering are being employed, i.e., the air treatment units are being employed as air purification apparatus. Operating the air treatment units independently (placing and distributing the air treatment units in location at an evenly spacing) is more effective and have a better performance than that when the same number of air treatment units are connected substantially and being operating as a built system (more than one units of air treatment units are being connected and teamed up to work as a single system). The effectiveness of the former can even achieve even up to 2.5 times to that of the latter one. In reverse, in a location where different types of pollutants are concentrated in one specific region, the teaming up and operating the air treatment units into a system can resulted to a better performance and greater effectiveness than that when the same number of units are placing evenly in space in the location and each operate alone independently. By connecting the air treatment units into a system, the pollutants can be eliminate in a more specific and particular manner. This also leads to the shortening of time for lowering the pollutants levels. In rapid treatment and effective removal of the pollutants meaning that less consumption of energy and less carbon emission will be involved. The objective of environmental protection and be readily achieved.

In another word, when the pollutants are distributed evenly in an environment, the air treatment unit 201, 202 and 203 can be applied and be operated as a standalone air purification unit individually. When the pollutants are concentrated in a particular region in that area, the air treatment unit 201, 202 and 203 are linked together through the connecting components and an air treatment system is built. The units are teamed up and operated in a co-ordination manner together. The present invention allows a flexible usage of air treatment units to improve the environment and air quality.

To determine whether the pollutants are distributed evenly in the environment, or they are concentrated as a particular spot or sources, the senses by human objectively can be applied. Besides, environmental sensors for detecting these pollutants levels can also be employed. The air treatment units may further include the position sensors. Each position sensor detects and gives out information on the position of the air treatment units. The air treatment units further contain at least one environmental sensor; the environmental sensor is employed to measure at least one of the following parameters: temperature, humidity, volatile organic compounds, formaldehyde, carbon dioxide, carbon monoxide, dust, ozone, nitrogen oxides, airborne bacteria, radon, air speed, air flow, air pressure, brightness of the environment. The position sensors and the environment sensors communicate with the central processing units. They send out the detected parameters and their respective levels to the central processing units. A display unit can further be included and be applied together with the air treatment units in the system, for displaying the detected parameters and their respective levels obtained by the position sensors and environment sensors.

The central processing unit of the air treatment unit further receives the signals from sensors to control the operation setting of the air treatment units. For example, base on signal obtained from the position and the environment sensors, the central processing unit calculate and estimate the best combination and orientation manner for the air treatment units in the system, and the control the operation of these air treatment units are then automatically performed. The air treatment units may comprise further display units or vocal output devices, the best recommendations about the combination and the orientation manners of the air treatment units in a system will be delivered to the user through these display units and/or vocal output device. The user may also arrange and operate the units in the system manually based on these recommendations.

The air treatment unit further contains interface ports. The central processing unit of the air treatment unit receives and transmits and receives the message of operation setting through the interface port.

The operation setting includes at least one of the following setting: operating time, airflow rate, airflow path, the on and off of the heating component, the temperature setting of the heating component, the on and off of the cooling component, the temperature setting of the cooling component, the on and off of the dehumidifying component, the dehumidifying level setting of the dehumidifying component, the on and off of the humidifying component, the humidifying level setting of the humidifying component, the on and off of the fan as well as the maintenance reminder (such as the change of the filter components, the cleaning of the components, or the replacement of the wear-out components).

When two or more of the air treatment units are built into an air treatment system, at least one of the air treatment unit is appointed as the master air treatment unit, the rest of the air treatment units are appointed as secondary air treatment units. The central processing unit of the master air treatment unit controls the central processing unit of the secondary air treatment units. That mean when the air treatment units are teamed up and built into a system, the original operation setting of the secondary air treatment units will be reset by the master air treatment unit.

The central processing unit of each air treatment unit further comprise embedded software for determines whether the unit to be a master or secondary air treatment unit. The central processing unit automatically follows the operation setting determined by the embedded software. When the air treatment units are teamed up and built into an air treatment system, the setting for operation as master and secondary air treatment unit are happened automatically.

The air treatment unit further includes a selector. The selector is used for appointing the air treatment unit to become a master air treatment unit or a secondary the air treatment unit manually.

The central processing unit receives the messages from the other air treatment units and/or the messages from outside of the air treatment system through the input port. The air treatment unit can also send out message to the other air treatment units or to the outside system, which is another air treatment system, through the output port. The messages can be in any analog/digital signal (ND) formats or in form of voltage/current through the wired/wireless transmitting. The message includes the operation setting of the master and secondary air treatment units in the system, the types and quantities of different air treatment units in the system and the operation settings of each air treatment unit in the system.

The above mentioned air treatment system further includes a control unit. The control unit works together with the air treatment units in the system, and control the operation setting of the air treatment units in the system.

When the air treatment units 201, 202 and 203 are connected together by teamed up and operate co-coordinately as a built air treatment system. The electric sources of the air treatment units 201,202 and 203 will be linked together. In such case, a single power supply is required for the operation of the air treatment units, the wiring can be minimized. Thus the problem and complexity of knotting and the tie-up of wiring is avoided. When one air treatment unit supply and transmit the electric power to its neighboring units, the power supply and transformer of itself shall able to supports the loading by her neighboring units, otherwise, a warning message or an alternative arrangement on power supply shall be available for the operation of the air treatment units in the system. Base on the necessity, batteries of any type can be applied as sources of the power supply.

Figure 2:
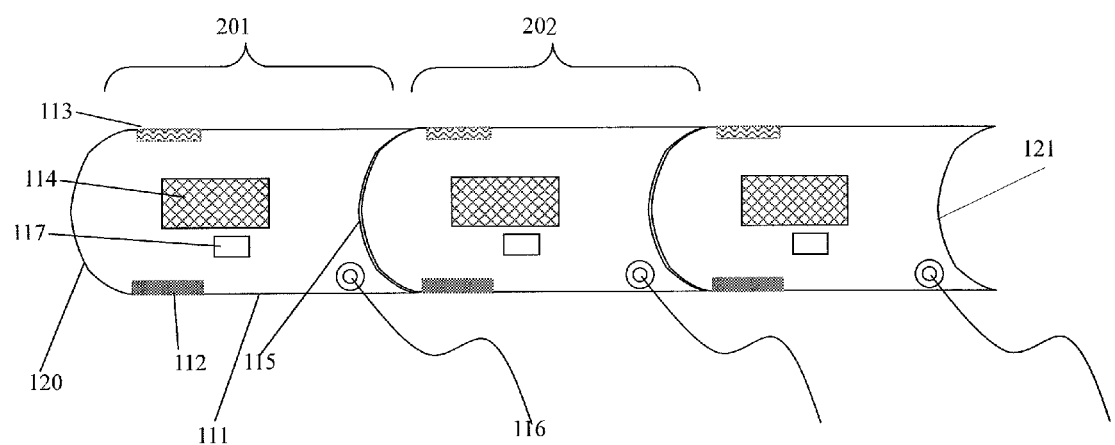
FIG. 2 is a schematic diagram of the present invention according to a second embodiment.

Refer to FIG. 2; the present embodiment is featured with the connecting components being formed by the appearance of the casing. Part of the casing of the air treatment unit contains a protruded shape and part of the casing of the air treatment unit contains a recessed shape. When the protruded shape case of one air treatment unit is fitted to the recessed shape case of another air treatment unit, the units are then linked and operate in co-ordination with one and other together.

Figure 3:
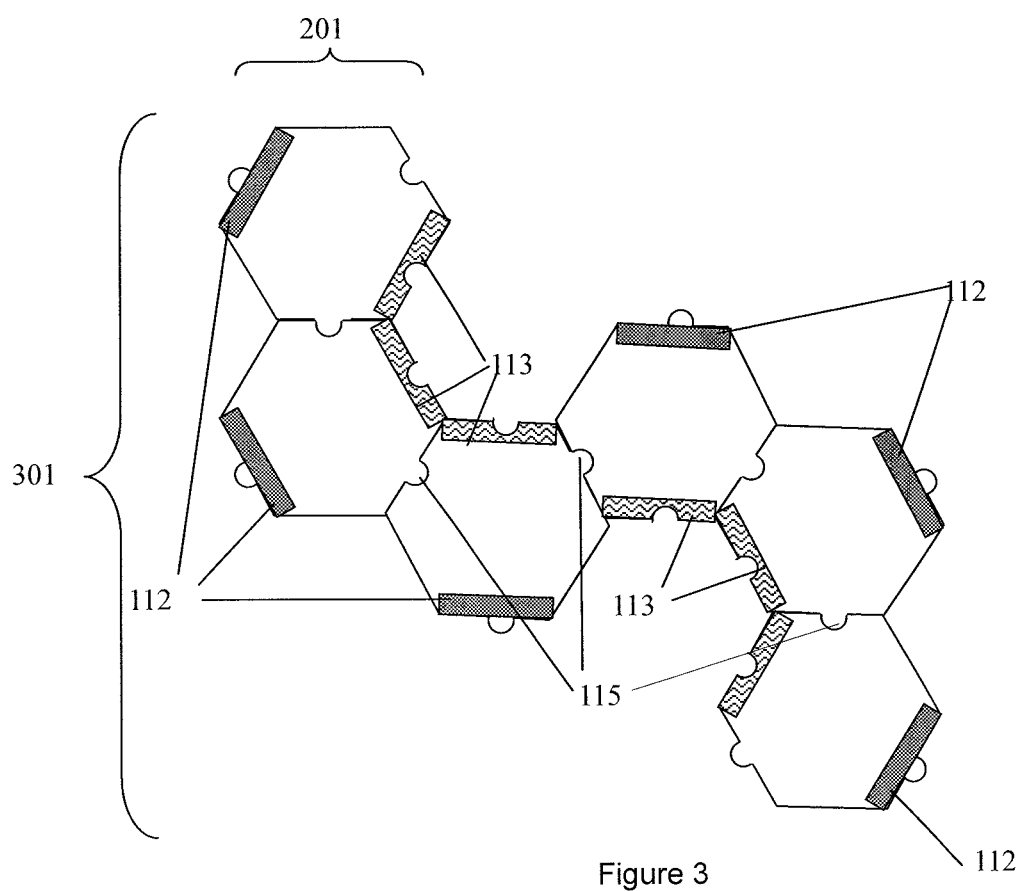
FIG. 3 is a schematic diagram of the present invention according to a third embodiment.

Refer to FIG. 3; the present embodiment is featured with an air treatment system 301 containing six air treatment units 201. When the six air treatment units 201 are connected together through the connecting components 115 and built into an air treatment system 301, all the air outlet 113 and air inlet 112 are pointing toward the environment without being blocked by any part of the casing of any unit. The casings of the air treatment units present in this example are in hexagon shape.

Figure 4:
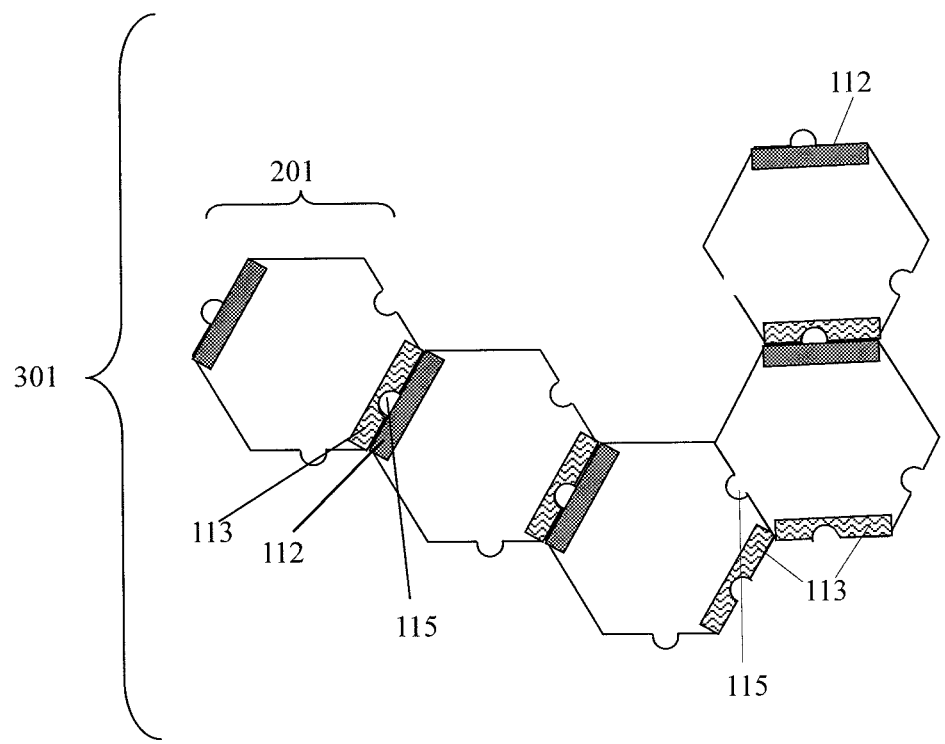
FIG. 4 is a schematic diagram of the present invention according to a forth embodiment.

Refer to FIG. 4; the present embodiment featured with an air treatment system 301 containing five air treatment units 201. When the five treatment units 201 are connected together through the connecting components 115 and an air treatment system 301 is built, the air outlets 113 of some air treatment units are connected to the air inlet 112 of the neighboring units. In the present example, three air treatment units having their air outlets 113 being connected to the air inlet 112 of the neighboring units. In such way, the overlapped and extra unnecessary components or devices of each air treatment units, such as blower or fan, pre-filter, power supply circuit board, converter, water tank for humidifier and dehumidifier can therefore be omitted. The overall volume of the air treatment units can be reduced. As fewer materials are being consumed and be used to construct the air treatment system, the real objective environmental protection can be achieved.

Figure 5:
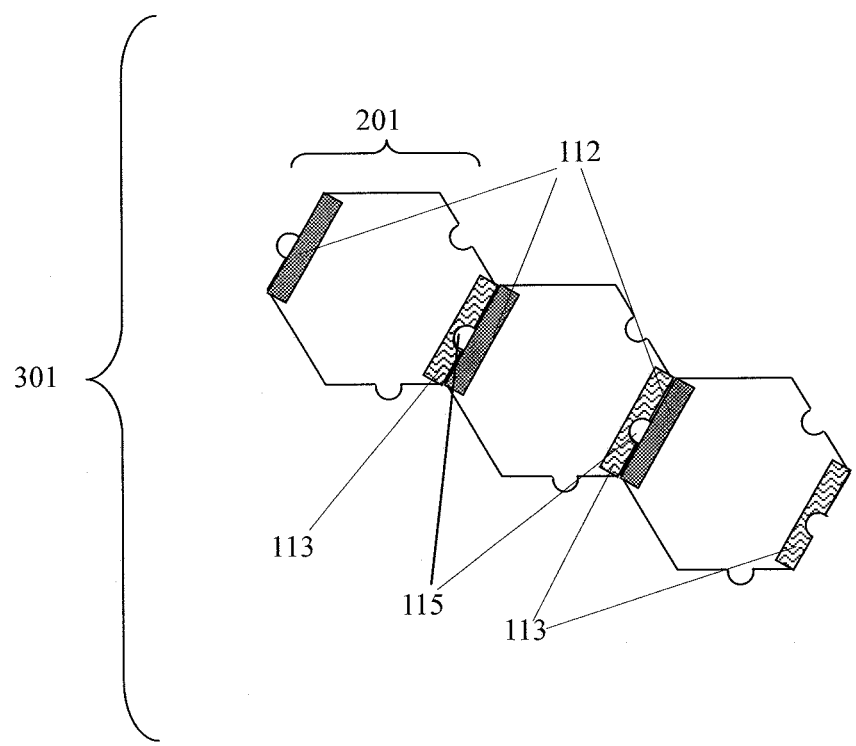
FIG. 5 is a schematic diagram of the present invention according to a fifth embodiment.

Refer to FIG. 5, the present embodiment is featured with an air treatment system 301 contains three air treatment units 201. When the three air treatment units 201 are connected together through the connecting components 115 and built into an air treatment system 301, all the air outlets 113 and air inlets 112 are connected together, except the air treatment units which positioned at the end of the air treatment system.

Figure 6:
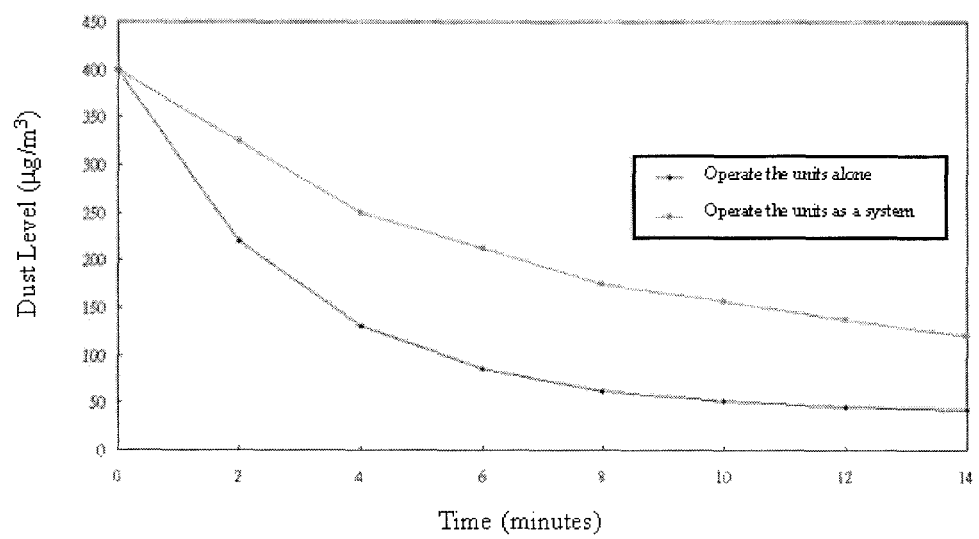
FIG. 6 indicates the comparison on the efficiency of four air treatment units in a location where the pollutants are distributed evenly; the comparison are made between (1) when the four air treatment units are working alone individually and (2) when the four air treatment units build into a system, being teamed up and operate in co-ordination with one and other.

Refer to FIG. 6 illustrated in an area with pollutants evenly distributed, (i) placing four standalone units of air treatment units in the location and let them working individually and (ii) connecting the four units into an air treatment system and let them operate together are compared. The room dimensions is 8 m×9 m×2.5 m (W×L×H) and the dust level within the room is about 400 µg/m³. The clean air delivery rate (CADR) for dust removal of each air treatment unit is 120. Employing four standalone units in the room and let them working individually can leads to better air purification performance and efficiency, which is about 2.5 times of that when connecting the four units into an air treatment system and let them operate together.

The above mentioned connecting methods for the connecting components of the air treatment units are all substantially performed (by direct contact). In fact, the link of the connecting components can also be non-substantially performed (non-contact). For example, the connecting components comprise a transmitter and a receiver. The transmitter of one air treatment unit sends out connection message in any form of electromagnetic wave, sound wave, electrical wave, magnetic wave, or of the combination of the thereof, to the receiver of the another air treatment unit, and the air treatment units are linked and being connected.

The air treatment devices equipped within each air treatment unit in the system can be entirely the same, partially the same or completely different. For example, in an air treatment system which is built up by five air treatment units, the five air treatment units may include two units with the air purification and filter component and fan being installed, one unit with a heating component being installed, one unit with the component for dehumidifying being installed, and one unit with the component for humidifying being installed. When these air treatment units are built into a system, the system is featured with the following functions: air purification and filtering, heating, dehumidifying and humidifying. In a humid environment where the temperature is low, the process of air purification and filtering, heating and dehumidifying can be performed. As there are only two fans included in the system, it is more economical to use two standalone units of air purifier, one standalone unit heater and one standalone unit dehumidifying machine individually. In addition, similar or even better performance and efficiency can also be achieved with the built system.

Figure 7:
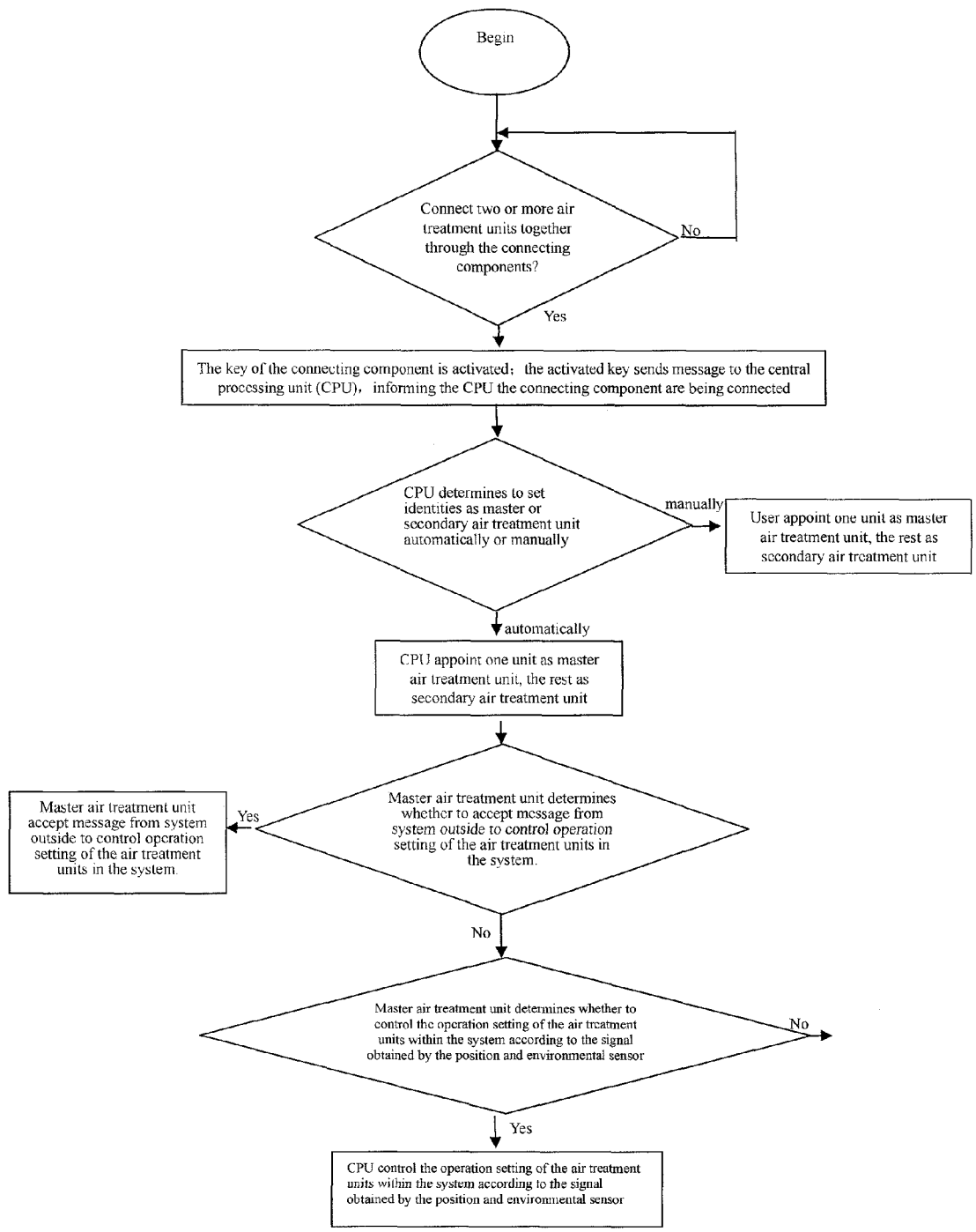
FIG. 7 is a flow chart of air treatment method mentioned in the present invention.

Refer to FIG. 7, a method of improving the air quality by the above mentioned air treatment system is carried out and involves the following procedures: Based on the room size and the distribution pattern of the pollutant in the area concerned, the best mode of air treatment will be selected. The user may also select to best mode according to his/her own sensation, or based on the results obtained from the environmental sensors. The room size and the pollutants distribution pattern may be obtained from the position sensors and the environmental quality sensors. The results obtained by sensors are relatively more accurate. For one instance, if the pollutants levels are distributed within the room evenly, the mode to allow the air treatment system to operate individual maybe selected. The air treatment units are then operated independently. Nevertheless, if the pollutants levels are specifically concentrated in certain area within the room, the mode of teamed up the air treatment units and allows them to operate in co-ordination with one and other will be selected.

If the mode of teamed up the air treatment units and allow them to operate together as a system is selected. The connecting component will then be linked. Two or more air treatment units will build up an air treatment system. The connecting component will activate the key at the same time. The activated key will send message to the central processing units of each air treatment unit and telling them that the connecting components are being linked. Upon being informed that the connecting components of the units are connected, the related software program in the central processing unit will be executed. The air treatment units within the same system are co-coordinated to operate together at their respective appropriate operation settings.

The central processing units will determined whether to set the air treatment units as a master or secondary air treatment units manually or automatically based on the embedded software which was implemented into it previously. If identities of the air treatment units as master or secondary air treatment units are to be set manually, the user will appoint one air treatment unit as the master unit and the rest as the secondary air treatment unit. If the identities of the air treatment units as master or secondary air treatment units are being set automatically, the central processing units appoint the one air treatment unit as a master air treatment unit and the rest as secondary air treatment unit. The central processing unit of the master air treatment unit overrides that of the secondary air treatment units. The central processing unit of the master air treatment unit controls the operation setting of the secondary air treatment units.

Refer to FIGS. 8a-FIG. 8f, the air treatment units, 201, 202, 203, 204 & 205 built an air treatment system 301. The air treatment device in the air treatment units are of different types:
  the air treatment device for 201 is a centrifugal fan;
  the air treatment device for 202 is a pre-filter,
  the air treatment device for 203 is a gas-filter comprising porous catalyst for gas phase pollutant adsorption and removal;
  the air treatment device for 204 is a HEPA filter,
  the air treatment device for 205 is a UV-Sterilizer for air purification.

The units 201, 202, 203, 204 and 205 can be operated individual if they are not connected to become an air treatment system. For example, the unit 201 helps improve the air ventilation by circulation the air in an environment. Units 202 and 204 are particle phase pollutant filters. When allow them to function alone, they can slightly reduce the particle level of the environment as they provide texture surfaces for the adhesion of the particle phase pollutants when the airborne suspended particle hit the surface of them. The UV-Sterilizer for air purification of 205 can help to kill the bacteria. The gas-filter comprising porous catalyst for gas phase pollutant adsorption and removal in the unit 203 allow the passive adsorption of gas phase pollutant, when being left alone.

In one instance (as shown in example 8a) where the sequence of the air treatment units in the air treatment system 301 is as 202-205-203-201-204, the air treatment units are connecting together by the connecting components which comprise a fastener that mechanically joins or affixes the five air treatment units together in a way that all the air outlets 113 of the air treatment units (excepting the last air treatment units 204 which located at the end of the system), are connected and linked directly to the air inlets 112 of the neighborhood air treatment units.

When this air treatment system 301 is in operation, the air 401 will pass into the system through the air inlet 112 of air treatment unit 202, and the purified air 402 will exit from the outlet 113 of air treatment unit 204. The air treatment system 301 is worked as an air purification system which have much better effect that operate each air treatment units (201,202, 203,204 & 205) individually.

Figure 8A:
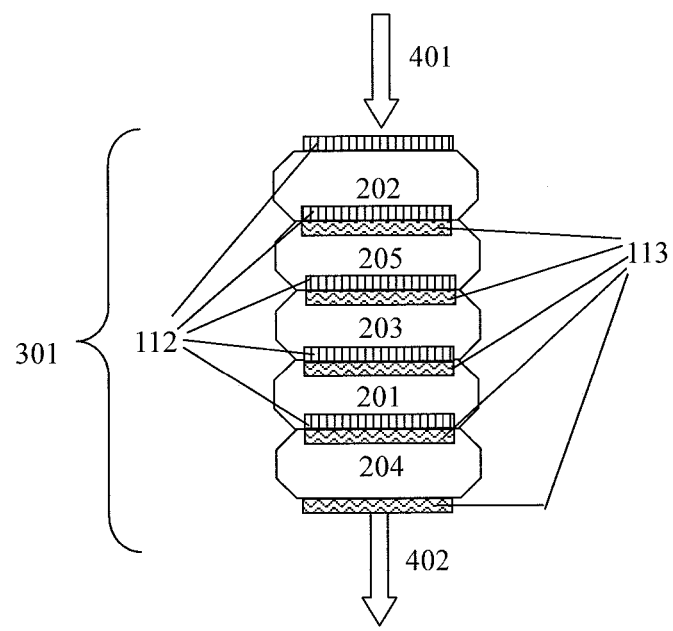
FIGS. 8a-8f illustrate an air treatment system.
Figure 8B:
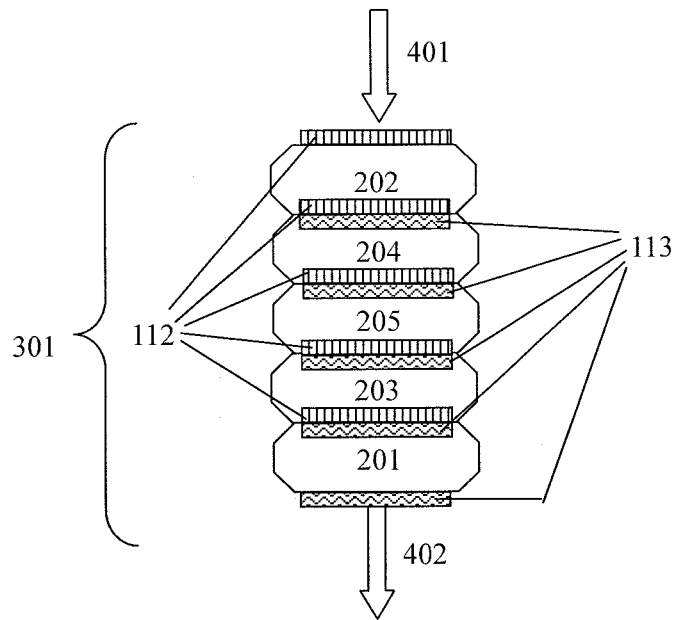
Figure 8C:
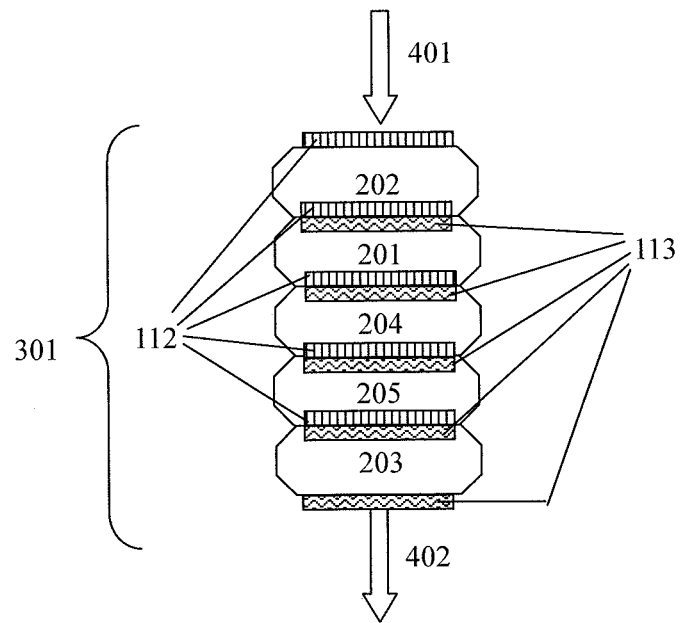
Figure 8D:
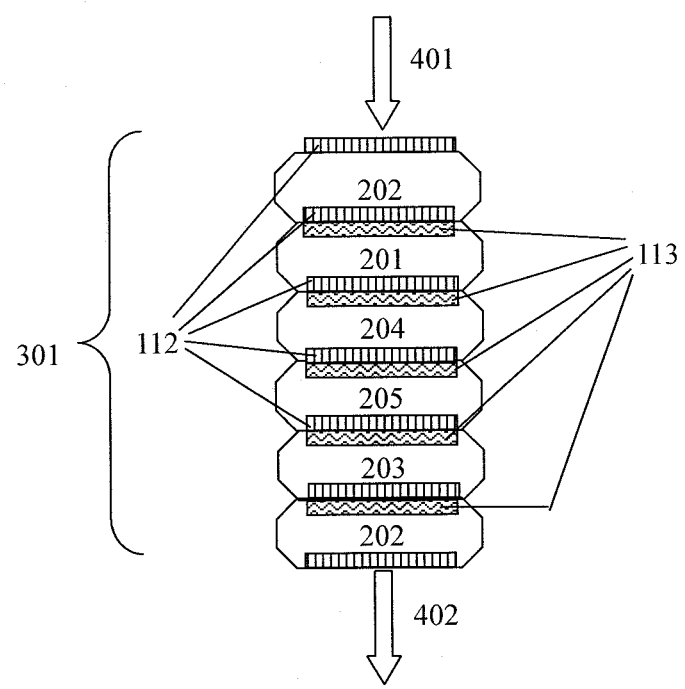
Figure 8E:
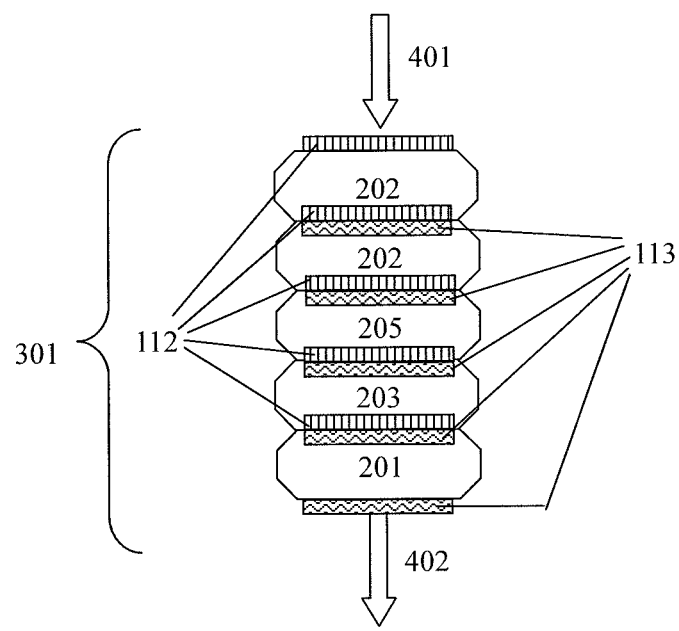
Figure 8F:
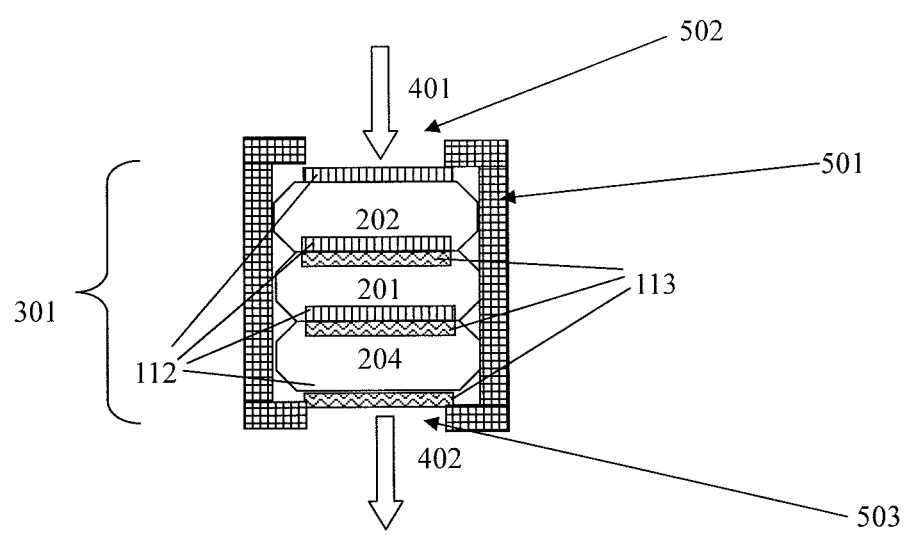

In the air treatment system 301 as shown in FIG. 8a, the large size particles in the incoming air 401 is first removed by the pre-filter in the unit 202, it is then irradiated by UV sterilizer in the unit 205 for bacteria disinfectant. The UV sterilizer also activates the gas phase pollutants before they enter into the unit 203. Therefore, a much significant of gas phase pollutant removal performance is therefore achieved by the unit 203, when it is operating in the combination of the unit 205 (technology of combination of removal of gas phase pollutant by porous materials after UV irradiation was described in EP1982734B1. This overall air flow in the system is created by the centrifugal fan in the unit 201, which allows the air to be gone into the units in a draw-through mode for the units 202, 205 and 203 and in a blow-through mode for the unit 204. The air is then further cleaned by blowing toward the HEPA filter 204 before exit as purified air 402. Thus, the air purification system with the air treatment units 202-205-203-201-204 is operated in co-ordination with one another, have a synergies effect in performances and effectiveness, when compare to that of when the units are operated individually.

The air treatment unit is flexible to be swapped for another air treatment unit within the air treatment system. In one instance, the sequence of the air treatment units in the air treatment system is 202-205-203-201-204 (as shown in example 8a). In another instance, an air treatment system with a sequence of air treatment units as 202-204-205-203-201 (as shown in example 8b), or 202-201-204-205-203 (as shown in example 8c) can be built. After the swapping of the units in the system, the performance might be further enhance or different from the original one, subjected to the air quality of the environment.

It is also flexible to further include or exclude any air treatment unit into or from the air treatment system 301. For example, when the particle phase pollutants in the environment are too high, an air treatment system (with two HEPA filters layer) having a sequence of air treatment units as 202-204-205-203-201-204 (as shown in example 8d) can be built. For example, when the cost of HEPA filter is in consideration, and the user want to include more pre-filter (which might be washable) but exclude the HEPA from the system, the system can be built with two or more units of 202 and excludes all units of 204, and the system becomes 202-202-205-203-201 (as shown in example 8e). In some simple form, an air treatment units as 202-201-204 (as shown in example 8f) can also be built for basic air purification.

To enable the flexibility as indicates in all the above examples and embodiment, each air treatment units are having one common pre-requisite requirement: the connecting components connect the air treatment units by the direct contacting the air treatment units substantially, through at least one of the following connecting method:

1. the connecting components comprise a buckle; in the buckle a protruded part and a recessed part are included; the protruded part of the buckle of one air treatment unit is fitted to the recessed parts of the buckle of another air treatment unit;
2. the connecting component is made and formed by the appearance of the casing of the air treatment unit; part of the casing of the air treatment unit contains a protruded shape and part of the casing of the air treatment unit contains a recessed shape; the protruded shape of one air treatment unit is fitted to the recessed shape of another air treatment unit;
3. the connecting components comprise a fastener that mechanically joins or affixes two or more air treatment units together.

When the connecting components connect the air treatment units by the direct contacting, an outer casing 501 which is used to encapsulate the all the air treatment units in the air treatment system is included (as shown in example 8f); the outer casing further comprises at least one air inlet 502 and at least one air outlet 503 that fit with the air inlet and air outlet of the air treatment units of the air treatment system, wherein the air inlet 113 and air outlet 112 of the air treatment units of the air treatment system are the pointing toward the environment without being obstructed.

The outer casting further acts as a fastener, which mechanically holds and affixes the all air treatment units in the air treatment system together. The outer casing also further enhance the safety measure of the system such as increase the barrier for voltage, by increasing the creepage distance for the voltage, when the power source of the air treatment units in the air treatment are also being connected together.

The above treatment method shall also include any of the following procedures:

The central processing unit of the master air treatment unit determines whether to accept the out coming-messages, which are generated from the outside system, for controlling the operation of all the air treatment units within its system. If the master air treatment unit determines to accept those out coming-messages, then the control of the operation of all air treatment units within the air treatment system will be controlled by the out coming-messages.

The central processing unit of the master air treatment unit will determine whether to control the operation setting of all air treatment units within its system, basing on the data obtained from the sensors within the system. If not, then the central processing unit will control the setting of all air treatment units within it system based on the pre-set embedded software. If yes, then the central processing unit will compute and calculate the best combination and orientation manners for placing the air treatment units, and to control the operation of all the air treatment units within the system automatically. If display unit and or vocal output device are available, the central processing unit will deliver the recommendation on the best combination and orientation manner of the air treatment units to the user through the display unit and or vocal output device. The user can operate the units according to those recommendations. The data obtained by the sensors may also be displayed onto the display unit, in case of need.

The present invention is illustrated above through the examples and embodiments. It will be appreciated by persons skilled in the art that numerous variations and/or modifications may be made to the invention as shown in the specific embodiments without departing from the scope or spirit of the invention as broadly described. The present embodiments are, therefore, to be considered in all respects illustrative and not restrictive.

Figure 9A:
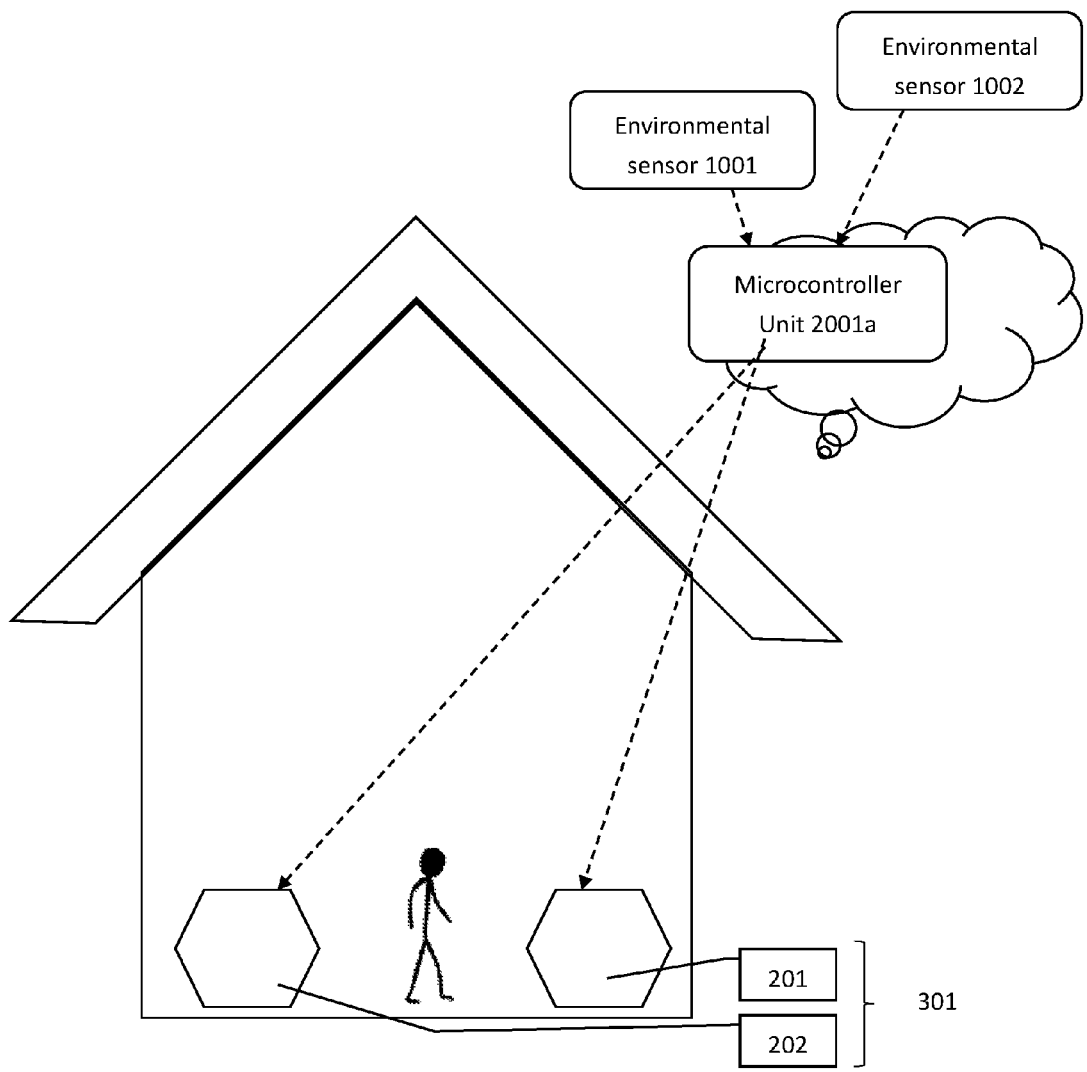
FIG. 9a illustrates the operation of the air treatment apparatus with an environmental sensor.

FIG. 9a illustrate in one embodiment, the at least one environmental sensor 1001, 1002 is located off-site from the air treatment apparatus 301; the level obtained from the at least one environmental sensor 1001 1002 is employed to operate the air treatment units 201 202 in the first mode and the second mode by the method: the level obtained from the at least one environmental sensor 1001 1002 is input to a microcontroller unit 2001a, which is located off-site from the air treatment apparatus 301; the microcontroller unit 2001a determine the mode of operation and send to the each air treatment units 201 202 the determination on the mode of operation by a receiver and transmitter wirelessly (indicated by the dot line in the figure).

Figure 9B:
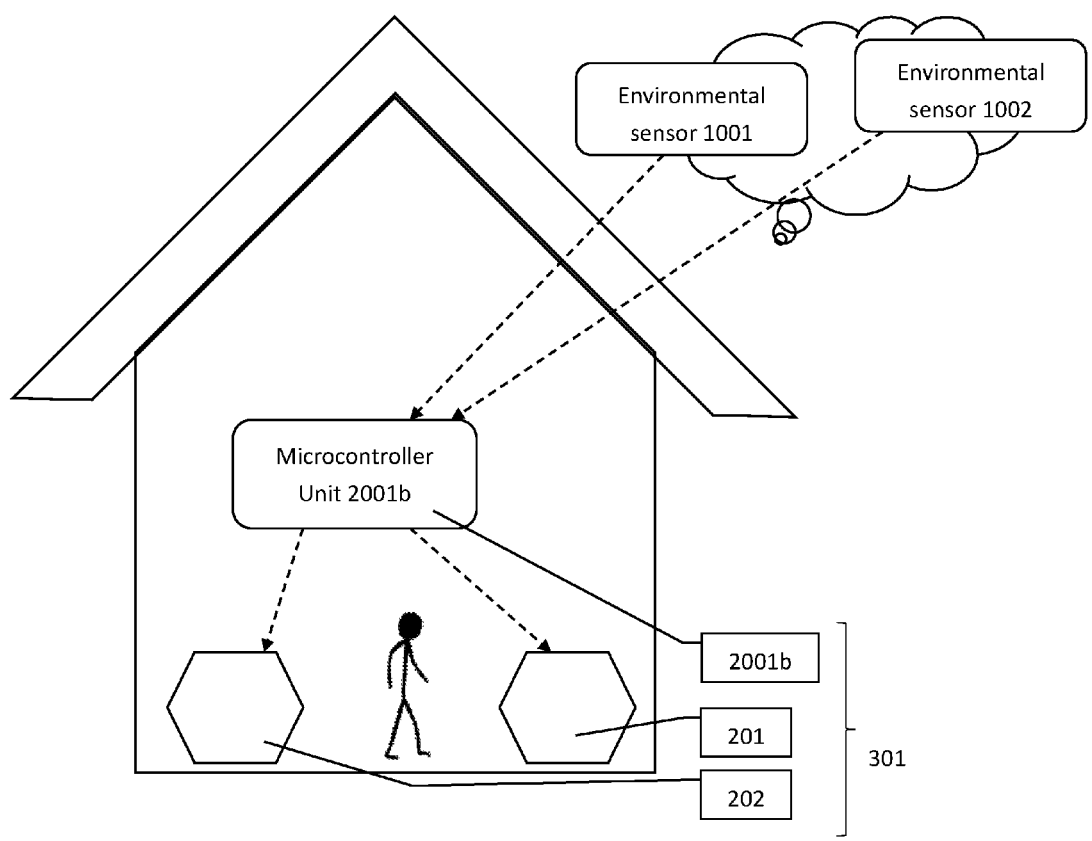
FIG. 9b illustrates the operation of the air treatment apparatus with an environmental sensor.

FIG. 9b illustrate in one embodiment, the at least one environmental sensor 1001, 1002 is located off-site from the air treatment apparatus 301; the level obtained from the at least one environmental sensor 1001 1002 is employed to operate the air treatment units 201 202 in the first mode and the second mode by the method: the level obtained from the at least one environmental sensor 1001 1002 is input to a microcontroller unit 2001b, which the microcontroller is further located in the air treatment apparatus 301; the microcontroller unit 2001b determine the mode of operation and send to the each air treatment units 201 202 the determination on the mode of operation by a receiver and transmitter wirelessly (indicated by the dot line in the figure).

Figure 9C:
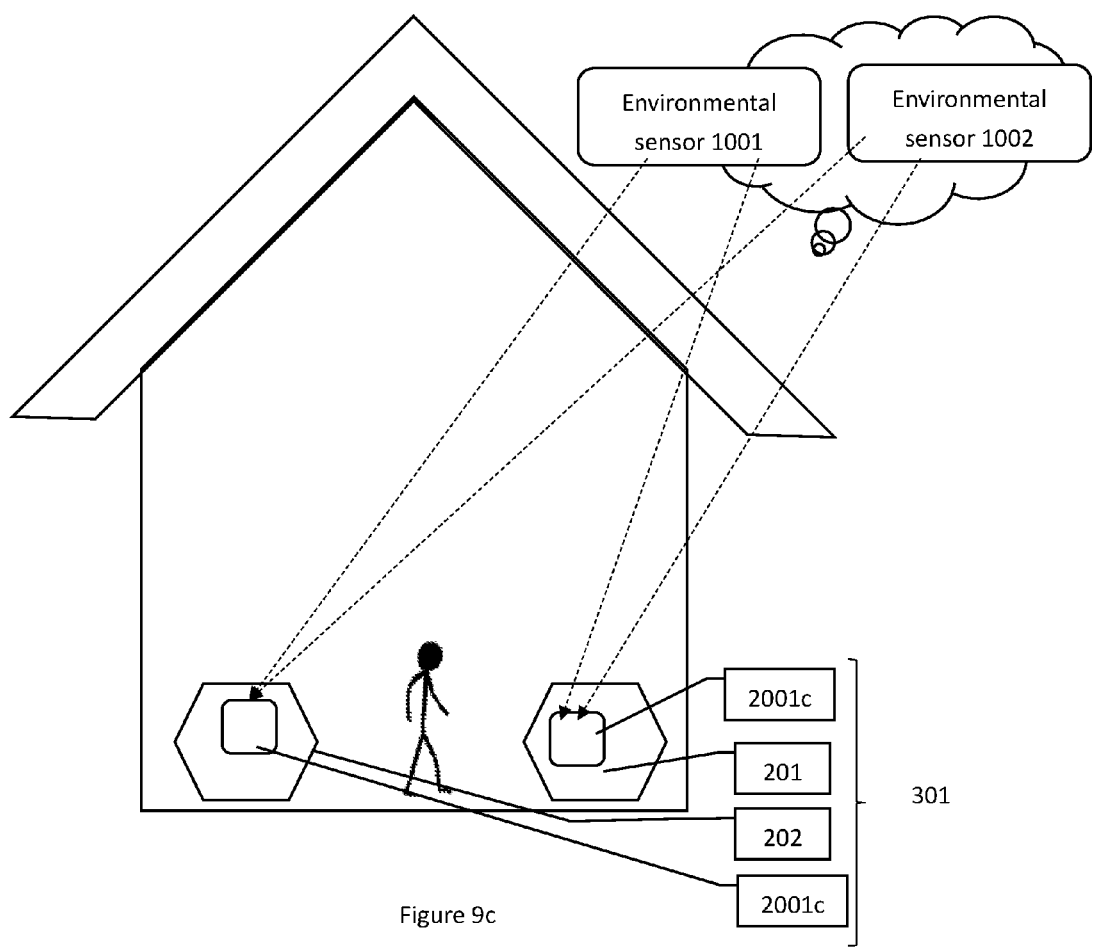
FIG. 9c illustrates the operation of the air treatment apparatus with an environmental sensor.

FIG. 9c illustrate in one embodiment, the at least one environmental sensor 1001, 1002 is located off-site from the air treatment apparatus 301; the level obtained from the at least one environmental sensor 1001 1002 is employed to operate the air treatment units 201 202 in the first mode and the second mode by the method: the level obtained from the at least one environmental sensor 1001 1002 is input to microcontroller units 2001c which located within the air treatment units 201 202 through a receiver and transmitter wirelessly (indicated by the dot line in the figure); the microcontroller unit 2001c determine the mode of operation and send to the each air treatment units.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:
1. An air treatment apparatus comprising:
air treatment units each comprising:
an air inlet;
an air outlet;
an air treatment device located between the air inlet and the air outlet; and
connecting components,
wherein the air treatment device within the air treatment units comprises at least one of the following components: components for air purification and filtering, heating, dehumidifying, humidifying, air-cooling, and/or components of blow-through fan, a draw through fan, or a pump,
wherein the air treatment device in the air treatment units are of different types, wherein the air treatment units are linkable and connectable by the connecting components, the connecting components further comprise a transmitter and a receiver, wherein connection of the air treatment units is non-substantially performed, wherein the air treatment units may operate in a first mode in which the air treatment units operate in coordination with one another together as a built system and a second mode in which the air treatment units operate alone as separate individual units, and wherein the air treatment units are configured to operate in the first mode and the second mode according to at least one level obtained by at least one environmental sensor, the first mode and the second providing different air treatment efficiency and performance, wherein the at least one environmental sensor is located off-site from the air treatment apparatus.

2. The air treatment apparatus according to claim 1, wherein the connecting components are detachable from the air treatment unit when the air treatment unit is working alone individually.

3. The air treatment apparatus according to claim 1, wherein when at least two air treatment units further connected substantially to form an air treatment system, the air inlets and air outlets in the system are in at least one of the following arrangement:
   I. all the air inlets and air outlets in the system are pointing toward the environment without being obstructed;
   II. the air outlets of some air treatment units are connected and linked directly to the air inlets of their neighborhood air treatment units; or
   III. all the air outlets of the air treatment units, excepting the last air treatment units which located at the end of the system, are connected and linked directly to the air inlets of the neighborhood air treatment units.

4. The air treatment apparatus according to claim 1, wherein the at least one environmental sensor for obtaining the level from at least one of the following environmental parameters: temperature, humidity, volatile organic compounds, formaldehyde, carbon dioxide, carbon monoxide, dust, ozone, nitrogen oxides, airborne bacteria, radon, air speed, air flow, air pressure and brightness of the environment; and/or at least a position sensors for detecting the position of the air treatment unit.

5. The air treatment apparatus according to claim 1, wherein the at least one environmental sensor is located off-site from the air treatment apparatus; the level obtained from the at least one environmental sensor is employed to operate the air treatment units in the first mode and the second mode by at least one of the following methods:
   i. the level obtained from the at least one environmental sensor is input to a microcontroller unit, which is located off-site from the air treatment apparatus; the microcontroller unit determines the mode of operation and sends to the each air treatment units the determination on the mode of operation by a receiver and transmitter wirelessly;
   ii. the level obtained from the at least one environmental sensor is input to a microcontroller unit, which the microcontroller is further located in the air treatment apparatus; the microcontroller unit determines the mode of operation and sends to the each air treatment units the determination on the mode of operation by a receiver and transmitter wirelessly; or
   iii. the level obtained from the at least one environmental sensor is input to microcontroller units which located within the air treatment units through a receiver and transmitter wirelessly; the microcontroller unit determines the mode of operation and sends to each of the air treatment units.

6. The air treatment apparatus according to claim 1, wherein the operation of the air treatment units in the air treatment system is controlled by one or more than one of the following methods:
   i. the pre-implemented with embedded software for controlling the operation setting of the air treatment unit in the system;
   ii. the system receives the signals from the outside to control the operation setting of the air treatment units in the system; or
   iii. the air treatment unit receives the signal from the sensor for controlling the operation setting of the air treatment unit in the system.

7. The air treatment apparatus according to claim 1, wherein an air treatment unit within the air treatment system is flexible such that the air treatment unit is swappable with another air treatment unit within the air treatment system; an additional air treatment unit is flexible to be included into the air treatment system; an air treatment unit within the air treatment system is flexible to be excluded from the air treatment system.

8. The air treatment apparatus unit according to claim 3, wherein an outer casing which is used to encapsulate all of the air treatment units in the air treatment system is included; the outer casing further comprises at least one air inlet and at least one air outlet that fit with the air inlet and air outlet of the air treatment units of the air treatment system.

9. The air treatment apparatus unit according to claim 1, wherein the connecting components connect the air treatment units by the direct contacting or non-contacting the air treatment units substantially, through at least one of the following connecting methods:
   I. the connecting components comprise a buckle; in the buckle a protruded part and a recessed part are included; the protruded part of the buckle of one air treatment unit is fitted to the recessed parts of the buckle of another air treatment unit;
   II. the connecting component is made and formed by the appearance of the casing of the air treatment unit; part of the casing of the air treatment unit contains a protruded shape and part of the casing of the air treatment unit contains a recessed shape; the protruded shape of one air treatment unit is fitted to the recessed shape of another air treatment unit;
   III. the connecting component comprises a transmitter and a receiver, the transmitter of one air treatment unit sends out connection message to the receiver of another air treatment unit; or
   IV. the air treatment unit contains at least one interface port, the air treatment unit receives and transmits the data through the interface port.

10. The air treatment apparatus according to claim 1, wherein the air treatment units, when operate in co-ordination with one another, exhibit a synergistic effect in performance, efficiency and the total energy consumption.

* * * * *